(12) United States Patent  
Miyata

(10) Patent No.: US 7,665,757 B2  
(45) Date of Patent: Feb. 23, 2010

(54) AIRBAG APPARATUS AND MOTORCYCLE HAVING THE SAME

(75) Inventor: Yasuhito Miyata, Tokyo (JP)

(73) Assignee: Takata Corporation, Tokyo (JP)

( * ) Notice: Subject to any disclaimer, the term of this patent is extended or adjusted under 35 U.S.C. 154(b) by 429 days.

(21) Appl. No.: 11/470,758

(22) Filed: Sep. 7, 2006

(65) Prior Publication Data

US 2007/0052215 A1    Mar. 8, 2007

(30) Foreign Application Priority Data

Sep. 7, 2005    (JP) .............................. 2005-259979

(51) Int. Cl.  
 B60R 21/16    (2006.01)
(52) U.S. Cl. .............. 280/728.2; 280/730.1; 280/743.1; 280/743.2
(58) Field of Classification Search .............. 280/728.2, 280/730.1, 730.2, 743.1, 743.2, 738  
See application file for complete search history.

(56) References Cited

U.S. PATENT DOCUMENTS

| | | | | |
|---|---|---|---|---|
| 3,888,508 A | * | 6/1975 | Kizu et al. ................... | 280/731 |
| 5,226,670 A | * | 7/1993 | Wright et al. ................ | 280/738 |
| 5,332,259 A | * | 7/1994 | Conlee et al. ................ | 280/738 |
| 6,247,726 B1 | * | 6/2001 | Ryan ........................... | 280/739 |
| 6,409,213 B2 | * | 6/2002 | Webber et al. ............... | 280/739 |
| 6,799,777 B2 | * | 10/2004 | Hawthorn et al. ........... | 280/742 |
| 6,827,170 B2 | | 12/2004 | Hamada et al. | |
| 7,364,192 B2 | * | 4/2008 | Braun et al. ................. | 280/739 |
| 2004/0150197 A1 | | 8/2004 | Iijima et al. | |

FOREIGN PATENT DOCUMENTS

| | | |
|---|---|---|
| DE | 38 17 848 C1 | 9/1989 |
| EP | 1 106 966 A2 | 6/2001 |
| EP | 1 342 653 A2 | 9/2003 |
| JP | 7-125609 A | 5/1995 |
| JP | 2005-178587 A | 7/2005 |

OTHER PUBLICATIONS

A search report dated Mar. 6, 2007, from the European Patent Office in corresponding European Application No. 06017557.7-2425.

\* cited by examiner

*Primary Examiner*—Toan C To  
(74) *Attorney, Agent, or Firm*—Fitch, Even, Tabin & Flannery

(57) ABSTRACT

A technique is provided that is effective in easily draining liquid entering the interior of housing for housing a prefolded airbag of an airbag apparatus mounted to motorcycles. In a first form, an airbag apparatus mounted to a motorcycle has an opening at the bottom of a retainer, through which the water entering a retainer can be drained to the outside of retainer.

9 Claims, 13 Drawing Sheets

AIRBAG APPARATUS AND MOTORCYCLE HAVING THE SAME

FIELD OF THE INVENTION

The present invention relates to a technique of constructing an airbag apparatus to be mounted to a motorcycle.

BACKGROUND OF THE INVENTION

There have been various known techniques of restraining occupants of motorcycles with airbag apparatuses. For example, known techniques include a technique of restraining an occupant with an airbag inflated by inflation gas in a frontal collision (e.g., refer to Japanese Unexamined Patent Application Publication No. 2003-327182). The airbag apparatus disclosed in Japanese Unexamined Patent Application Publication No. 2003-327182 has a structure in which a prefolded airbag is housed in a bottomed-box-shaped housing and in which an airbag opening arranged at the top of the housing is covered with a cover (airbag cover). The cover is torn open along a fragile portion with the deploying motion of the airbag to open the airbag opening, thereby enabling the deploying motion of the airbag from the interior of the housing to the exterior.

The housing for accommodating a prefolded airbag, as in the airbag apparatus described in Japanese Unexamined Patent Application Publication No. 2003-327182, has a bottomed box shape having an airbag opening at the top. Accordingly, it has the problem that even if the tightness of the housing is increased, liquid such as water or oil may be prone to enter or reside in the housing through the periphery of the airbag opening. Particularly, general motorcycles have an airbag apparatus exposed to the outside of the vehicle body in contrast to cars, so that such a problem may be pronounced under the influence of rain, cleaning water, and humidity.

SUMMARY OF THE INVENTION

The invention is made in view of the problems. Accordingly, it is an object of the invention to provide a technique effective in easily draining liquid entering the interior of a housing for a prefolded airbag of an airbag apparatus mounted to motorcycles.

In order to achieve the above object, the invention described in the claims is provided. Typically, the invention can be applied in constructing airbag apparatuses to be mounted to various motorcycles. In this specification, "a motorcycle," a typical example of vehicles, includes various saddle-type vehicles that an occupant straddles, such as touring motorcycles having a fuel tank in front of an occupant seat and motor scooters having a space between an occupant seat and a handlebar-supporting head pipe. In addition to the motorcycles, the "motorcycle" includes vehicles that occupants straddle and having three or more running wheels (e.g., three-wheel motorbikes for use in home delivery service and three- or four-wheel buggies for bad roads) and vehicles that occupants ride on and running by sledges or caterpillars, such as snow mobiles.

A first form of the present invention for solving the above-described problem is an airbag apparatus mounted to a motorcycle and includes at least gas generation device, an airbag, a housing, and an opening.

The gas generation device of the invention is a device for generating airbag inflation gas. The airbag of the invention restrains an occupant by deploying into an occupant restraining region in front of the occupant by the airbag inflation gas generated by the gas generation device in a frontal collision of the motorcycle. Here the "frontal collision" indicates that a motorcycle comes into a frontal collision with a running or still front object such as a vehicle, a pedestrian, an obstacle or the like. The "occupant restraining region" is defined as a space extending in the direction of the forward movement of an occupant who is moving ahead of the motorcycle by a kinetic energy during a frontal collision, and a space for restraining the occupant who is flung ahead of the motorcycle by the kinetic energy.

The housing of the invention is a bottomed box (casing) that houses an airbag and has an airbag opening that allows the deployment of the airbag. This housing, even if its tightness is improved, may be apt to allow liquid such as water or oil to enter through the periphery of the airbag opening or reside therein because of the bottomed box shape having the airbag opening on the top. Particularly, general motorcycle vehicles have an airbag apparatus exposed to the outside of the vehicle body in contrast to cars, so that this problem may be pronounced under the influence of rain, cleaning water, and humidity.

Therefore, according to the invention, the housing has an opening at the bottom area. The opening can drain the liquid in the housing to the exterior. The opening may be a hole, a slit, mesh, a punching plate, or another opening. Thus the water entering the housing is drained therefrom through the opening. Particularly, providing a vertical opening allows the water entering the housing to be drained to the outside of the housing continuously or intermittently through the opening by gravitation.

Thus the arrangement of the airbag apparatus according to the first form of the invention enables the liquid entering the airbag housing to be drained through the opening.

A second form of the invention for solving the above-described problem is an airbag apparatus wherein the bottom area of the housing of the first form of the invention has a downward slope toward the opening. This promotes guiding of the liquid in the housing toward the opening. The "downward slope" may be a linear slope, an arcuate slope, a curved slope, or other various slopes that can allow the liquid to flow toward the opening.

Thus the arrangement of the airbag apparatus according to second form of the invention enables the liquid entering the housing to be drained through the opening.

A third form of the invention for solving the above-described problem is an airbag apparatus wherein the opening described in the first or second form of the invention is located at the lowest of the bottom area when the motorcycle tilts. The "tilt" here generally indicates the case where a motorcycle tilts to the right or left, where the front of the vehicle becomes lower than the rear, and where the front of the vehicle becomes higher than the rear. Motorcycles tilt to the right or left when parked at rightward or leftward incline, or when tilted to the right or left during driving on a right or left curve. Motorcycles tilt to the front or rear on a uphill or downhill run or when the housing itself is combined to the body on a slant.

Thus the arrangement of the airbag apparatus according to the third form of the invention is rational because it enables the liquid entering the housing to be drained through the opening by using the tilt of motorcycles.

A fourth form of the invention for solving the above-described problem is a motorcycle having the airbag apparatus according to one of either the first, second, or third form of the invention.

Thus, the invention of fourth form can provide a motorcycle having an airbag apparatus capable of easily draining the liquid entering the airbag housing through the opening.

The airbag apparatus to be mounted to a motorcycle according to the present invention has an airbag housing shaped like a bottomed box having an airbag opening that allows deployment of the airbag. The housing has an opening at the bottom area through which liquid in the housing can be drained. This arrangement enables the liquid entering the housing to be drained easily.

DETAILED DESCRIPTION OF THE PREFERRED EMBODIMENTS

Figure 1:
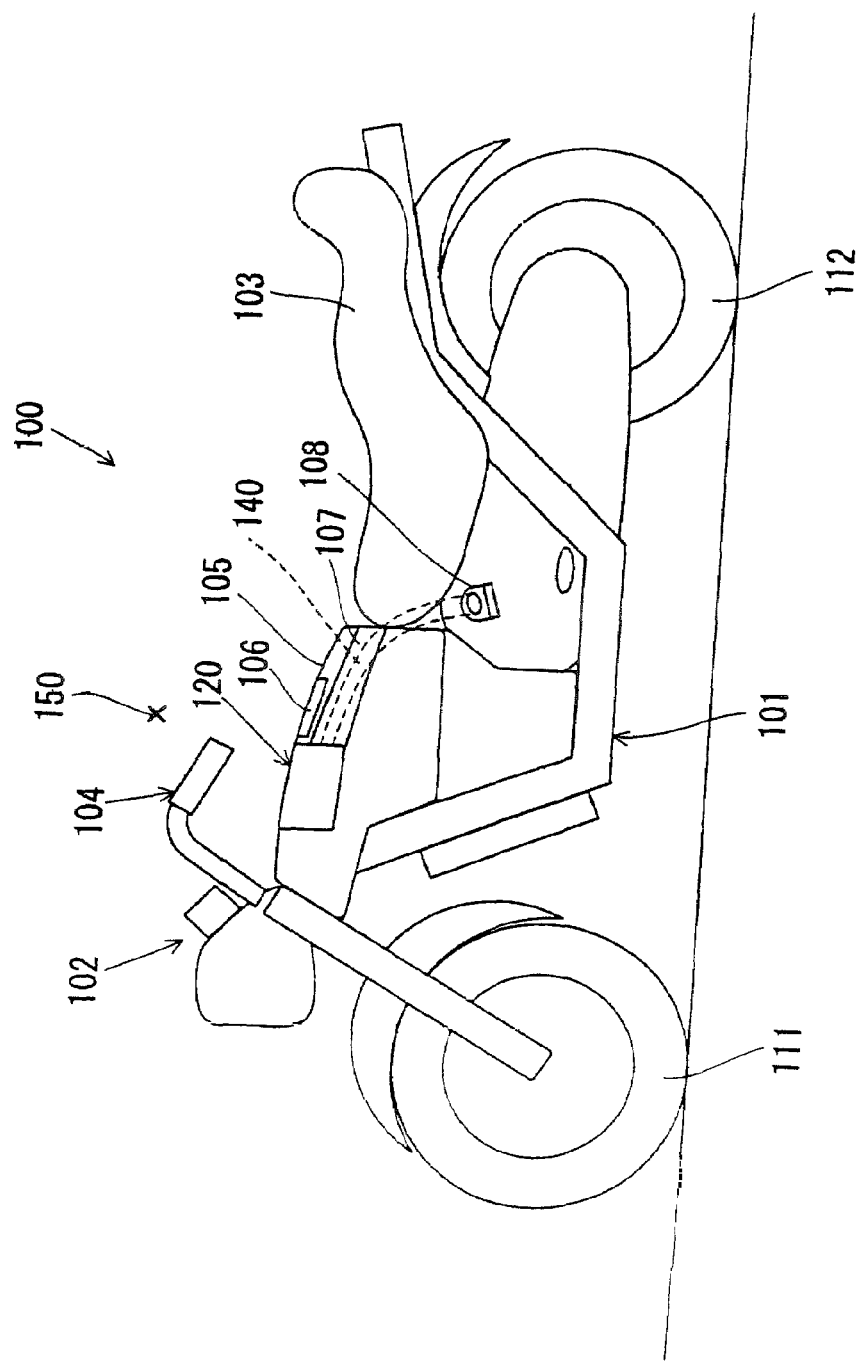
FIG. 1 is a side view of a motorcycle 100 according to an embodiment of "a motorcycle" of the invention, showing a state in which an airbag apparatus 120 is mounted to the motorcycle 100.
Figure 2:
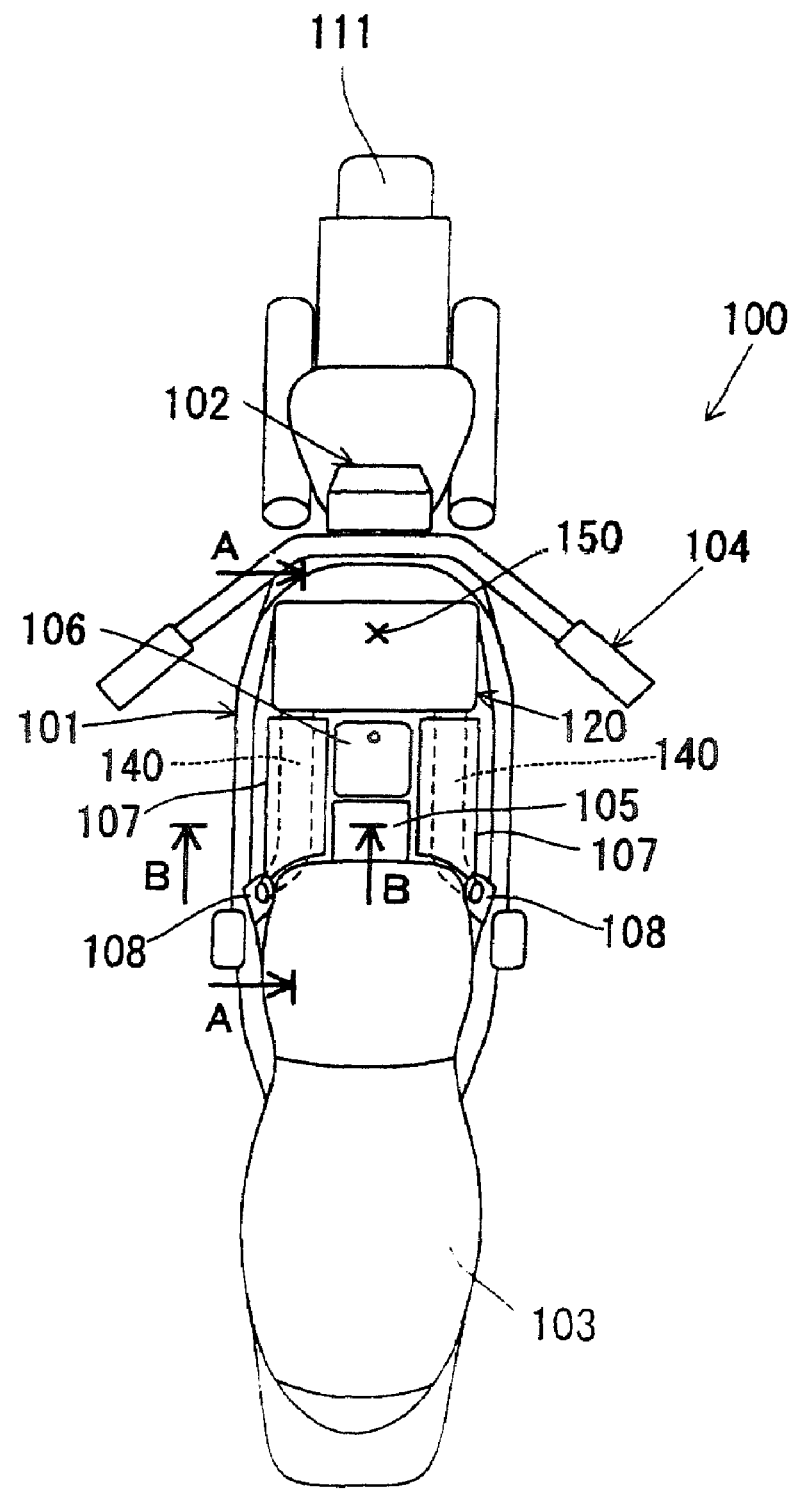
FIG. 2 is a diagram showing the motorcycle 100 in FIG. 1 as viewed from the top thereof.

An embodiment of the present invention will be described specifically with reference to the drawings. Referring first to FIGS. 1 and 2, the entire structure of a motorcycle 100 will be described. FIG. 1 is a side view of the motorcycle 100 according to an embodiment of the invention, showing a state in which an airbag apparatus 120 is mounted to the motorcycle 100. FIG. 2 shows the motorcycle 100 of FIG. 1, viewed from the top of the vehicle. The motorcycle 100 of the embodiment is an example of "a motorcycle" or "a motorcycle vehicle" of the invention.

Referring to FIGS. 1 and 2, the motorcycle 100 is what is called a touring motorcycle and mainly comprises a body frame 101 including an engine and a main frame; a seat 103 that occupants can straddle; handlebars 104; a front wheel 111; and a rear wheel 112.

A region above the body frame 101 of the motorcycle 100 and in front of an occupant seated in the seat 103 is defined as an occupant restraining region 150 in the event of a frontal collision of the motorcycle 100. The "frontal collision" in the embodiment indicates that the motorcycle 100 collides with various front objects (e.g., a vehicle, a pedestrian, an obstacle, and a guardrail, not shown for convenience sake). The "occupant restraining region 150" of the embodiment corresponds to "an occupant restraining region" of the invention, which is defined as a space extending in the direction of the forward movement of an occupant seated in the seat 103 during a frontal collision, for restraining the occupant who is flung ahead of the motorcycle by a kinetic energy.

A front portion 102 of the body frame 101 includes a headlight, various meters, switches, a windshield, and the like. A fuel tank 106 is disposed at the front of a body component 105 between the front portion 102 and the seat 103. The airbag apparatus (also referred to as an airbag module) 120 is disposed in front of the fuel tank 106. Webbing covers 107 for covering a pair of right and left webbings 140 that is a component of the airbag apparatus 120 are disposed on both sides of the fuel tank 106. The webbings 140 cannot or hardly be seen from the exterior owing to the covering by the webbing covers 107 in a normal state in which the airbag apparatus 120 is inoperative. The webbings 140 will be specifically described later in the description of the airbag apparatus 120.

The structure of the airbag apparatus 120 of this embodiment will be specifically described with reference to FIGS. 3 to 14. The airbag apparatus 120 is disposed so as to face the occupant restraining region 150 for the occupant seated in the seat 103. The airbag apparatus 120 corresponds to "an airbag apparatus" of the invention.

Figure 3:
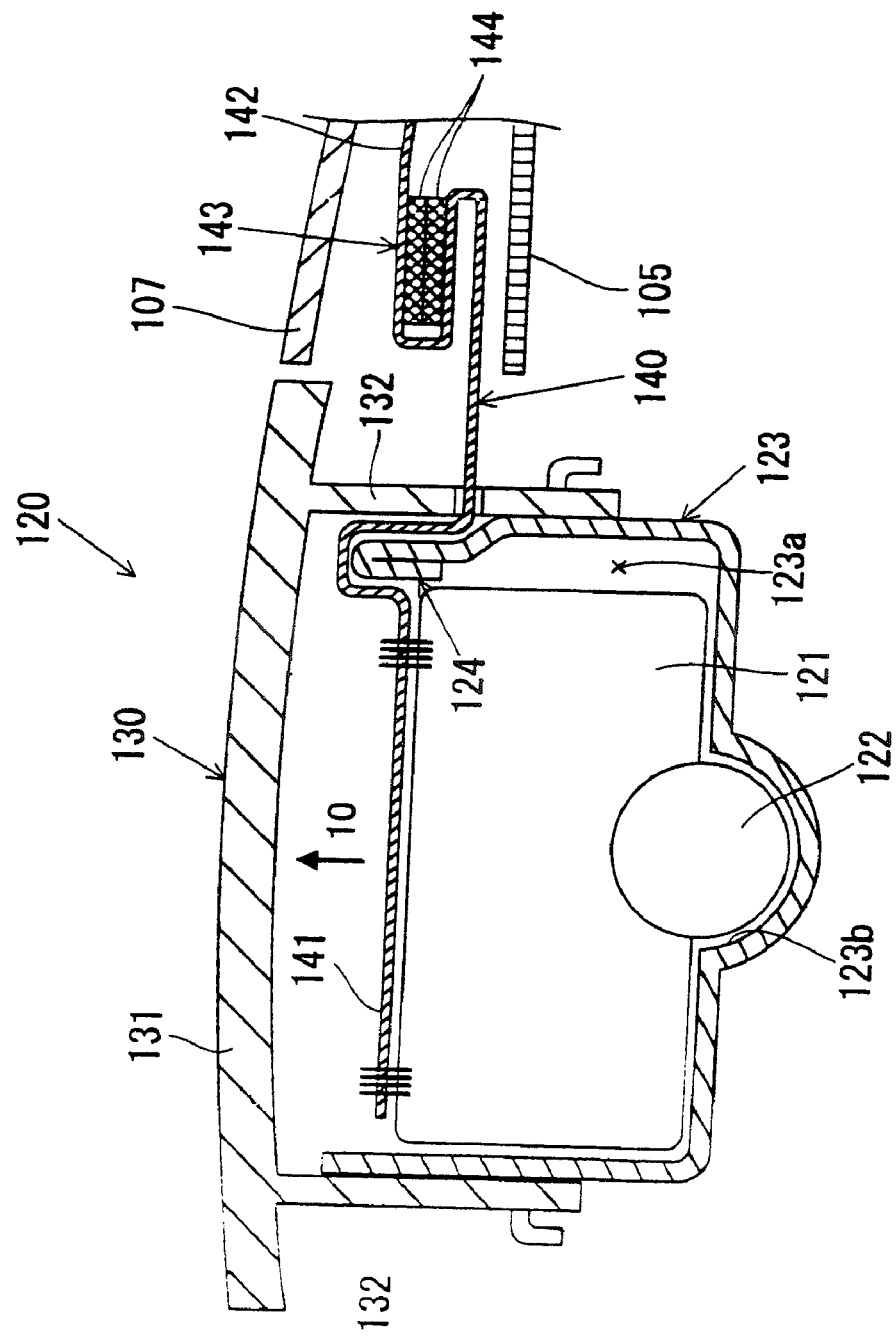
FIG. 3 is a sectional view of the motorcycle 100 in FIG. 2 taken along line A-A.
Figure 4:
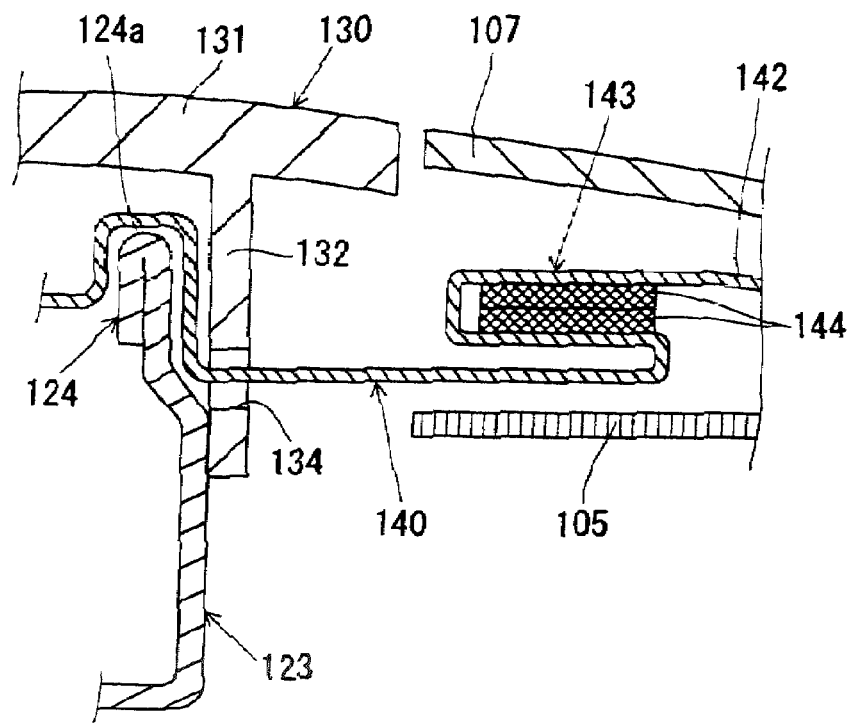
FIG. 4 is a fragmentary enlarged view of FIG. 3.
Figure 5:
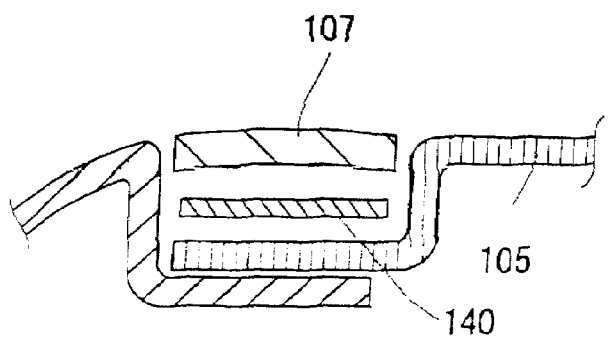
FIG. 5 is a cross sectional view of the motorcycle 100 taken along line B-B in FIG. 2.

FIG. 3 is a sectional view of the motorcycle 100 in FIG. 2 taken along line A-A; FIG. 4 is a fragmentary enlarged view of FIG. 3; and FIG. 5 is a cross sectional view of the motorcycle 100 taken along line B-B in FIG. 2. As shown in FIGS. 3 and 4, the airbag apparatus 120 mainly comprises an airbag 121, an inflator 122, a retainer 123, a module cover 130, and the webbings 140.

The airbag 121 is housed in the retainer 123 in a predetermined folded state (like a bellows or a roll). In FIG. 3, the direction of the inflation (deployment) of the airbag 121 is indicated by arrow 10. The airbag 121 is made of a material similar to airbag cloth for cars. The airbag 121 corresponds to "an airbag" of the invention.

The inflator 122 is a gas supply device that supplies inflation gas into the airbag 121 at a vehicle collision so that the airbag 121 in a folded state inflates while deploying from the retainer 123. The inflator 122 corresponds to a gas generation device of the invention.

The retainer 123 is shaped like a bottomed box having at least an airbag housing 123a for the airbag 121 and an inflator housing (recess) 123b for the inflator 122. The retainer 123 houses the airbag 121 and has an opening (airbag opening) at the top, which allows the deployment of the airbag 121. The retainer 123 is typically formed by pressing a metallic material. The retainer 123 corresponds to "a bottomed-box-shaped housing for housing the airbag."

In this embodiment, the webbings 140, to be described later, extend from the interior of the retainer 123 to the exterior. Accordingly, the webbings 140 may be locally worn down by contact with the retainer 123 when the vehicle vibrates during traveling, when the webbings 140 are retracted from the housing for maintenance, and when the webbings 140 are extended from a loose state with the deployment of the airbag 121. The retainer 123 of the embodiment therefore has a bent portion 124 at the portion with which the webbing 140 may come into contact. The bent portion 124 has a smooth surface (a smooth surface 124a in FIG. 4) at the upper end of the metal-plate retainer 123. The smooth surface 124a is formed by folding back (bending) the upper end (plate end) of the retainer 123. The smooth surface 124a is an arc-shaped smooth surface (arcuate surface) corresponding to part of a circle or ellipse and as such, and it has a function of reducing the sliding resistance between the contact portion of the retainer 123 and the webbings 140 to enable smooth sliding.

Specifically, the smooth surface 124a is shaped to allow the movement of the webbings 140 while maintaining surface contact with the webbings 140 in the moving direction of the webbings 140 when the vehicle vibrates, when the webbings 140 are retracted for maintenance, and when the webbings 140 are moved with the deployment of the airbag 121. At that time, the curvatures of the webbings 140 and the smooth surface 124a are substantially equal at the region where the webbings 140 and the smooth surface 124a are in contact. In other words, the smooth surface 124a serves to guide the webbings 140 relative to the retainer 123 while maintaining the surface contact so as to agree the curvature of the webbings 140 with the curvature of the smooth surface 124a.

This arrangement can prevent the wear of the webbings 140 made of, e.g., fibers due to contact with the metallic retainer 123 by use of the smooth surface 124a of the bent portion 124. Since, in this embodiment, the retainer 123 itself in contact with the webbings 140 has the smooth surface 124a, the smoothing structure is simplified, thus decreasing the number of components. It is preferable to increase the surface area of the smooth surface 124a of the bent portion 124 to thereby disperse the local frictional force to the webbings 140. A more detailed description of the retainer 123 will be given hereinlater.

The module cover 130 covers the opening (airbag opening) of the retainer 123 from above to thereby cover the airbag 121, and has at least a top plate 131 and an erect portion 132. The module cover 130 is typically molded of a resin material.

The top plate 131 extends substantially horizontally in the direction of the opening surface at the airbag opening region of the retainer 123 to thereby form the upper surface of the airbag apparatus 120. The erect portion 132 is a plate portion and extends vertically from the lower surface (back) of the top plate 131 toward the retainer 123 to cross the extending direction of the top plate 131. The erect portion 132 is secured to the retainer 123 with fixing portions (fixtures 128, to be described later) of the retainer 123 to thereby join the module cover 130 and the retainer 123 together.

Referring to FIG. 4, a pair of right and left through holes 134 that communicate the interior of the module cover 130 with the exterior is provided at the part of the rising portion 132 adjacent to the rear of the vehicle (adjacent to the occupant). The webbings 140, to be described later, can extend from the interior to the exterior of the module cover 130 through the through holes 134. When the top plate 131 receives the deploying force of the airbag 121 at a vehicle collision, the module cover 130 is torn open along a tear line 133 and two tear lines 135, to be described later, of the erect portion 132, to release the covering of the opening (airbag opening) of the retainer 123. This enables the deployment of the airbag 121. A more detailed description of the module cover 130 will be given hereinlater.

In this embodiment, the airbag 121 is tethered to the body of the motorcycle 100 with the pair of right and left elongated webbings 140. The webbings 140 are formed like a belt made of the same material as that of car seatbelts (resin fiber belt) or the same material as that of airbag cloth. The webbings 140 may be formed like a strap instead of the belt. A first end 141 of each webbing 140 is stitched to the airbag 121 and a second end 142 is joined to a fastener (a fastener 108 in FIGS. 1 and 2) on the body. In other words, the webbings 140 extend in the front and back direction in parallel at two positions between the airbag apparatus 120 and the vehicle body. As shown in FIGS. 4 and 5, when the airbag apparatus 120 is in an inoperative state, the webbings 140 extend in the housing space between the webbing covers 107 and the body component 105, and the upper parts of the webbings 140 are covered with the webbing covers 107.

Since the webbings 140 are in an irregularly loose state while the airbag is housed, the extending motion of the webbings 140 from the loose state with the deployment of the airbag at a frontal collision of the vehicle may exert an influence on a desired deploying motion of the airbag 121. Therefore, in the embodiment, each webbing 140 has a folded portion 143 below the webbing cover 107 so as to keep the looseness of the webbing 140 in a predetermined bunched state before the activation of the airbag apparatus 120 (while the airbag 121 is housed). The loose portions at the folded portions 143 of the webbings 140 are piled (folded back). The opposing surfaces of the loose portion are provided with a hook-and-loop fastener 144 that can temporarily hold the loose portion in a predetermined folded state (a predetermined bunched state).

The hook-and-loop fastener 144 has a known structure, which is a detachable tape using a pile structure and is the so-called Velcro fastener. Specifically, the hook-and-loop fastener 144 has small mushroom-shaped expanded portions (or hooks) on one surface, and loops on the other surface. When the two surfaces are put together, the mushroom portions (or hooks) are caught (hooked) in the loops, so that they easily stick to each other; when they are pulled from each other, the mushrooms come out from the loops, so that they are easily peeled from each other.

With such a structure, the folded (bunched) state of the folded portion 143 while the airbag is housed can temporarily be kept by the hook-and-loop fastener 144. On the other hand, when a predetermined tensile load is applied to the webbings 140 at the deployment of the airbag 121, the retaining force by the hook-and-loop fastener 144 is released, so that the folded (bunched) state of the folded portion 143 is released.

Figure 6:
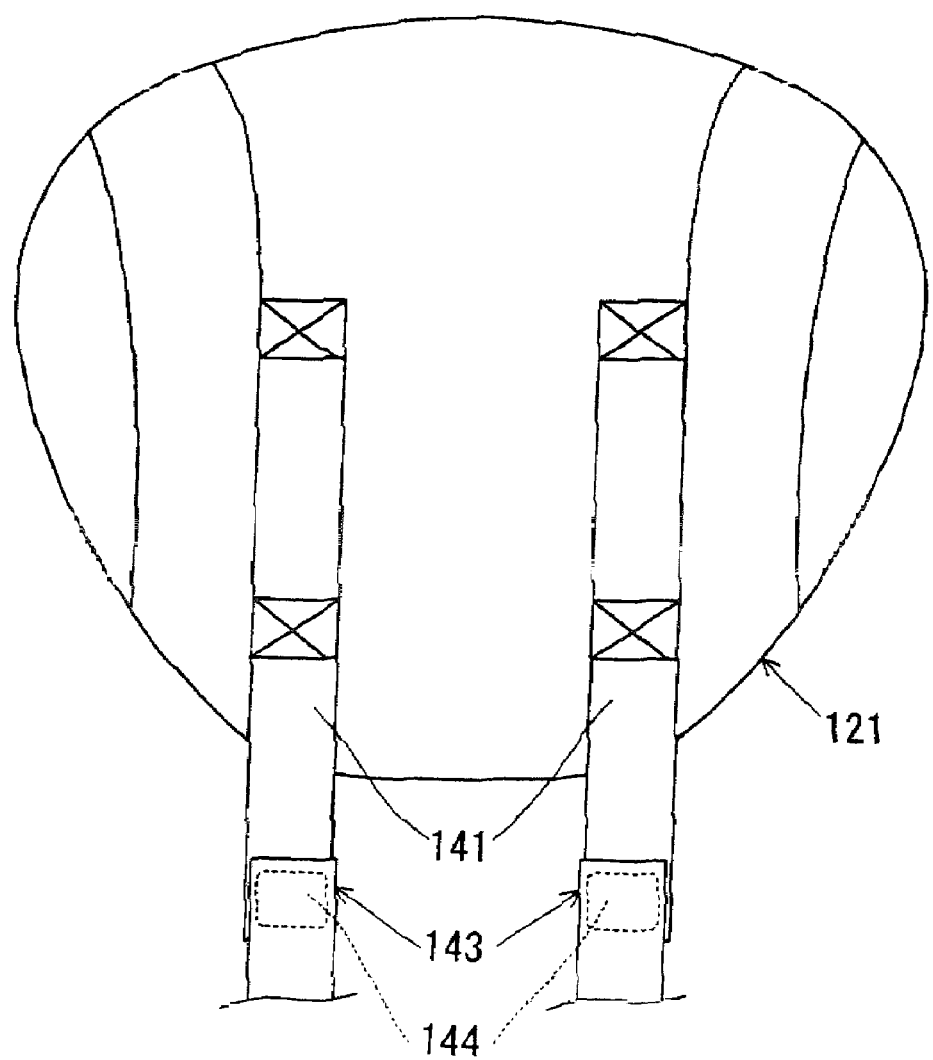
FIG. 6 shows the structure of folded portions 143 of webbings 140 of the embodiment.

FIG. 6 shows the structure of the folded portions 143 of the webbings 140 of the embodiment. As shown in FIG. 6, in this embodiment, the folded portions 143 are disposed substantially symmetrically. This arrangement can reduce the looseness of the webbings 140 while the airbag is housed and makes the loads of the right and left webbings 140, which extend at the deployment of the airbag 121, on the airbag 121 substantially equal, thus being effective in deploying the airbag 121 laterally equally.

For the webbing holding structure, the embodiment can employ another webbing holding device other than the hook-and-loop fastener 144, provided that the folded state of the folded portions 143 can temporarily be held. For example, the folded state of the folded portions may be temporarily kept by a structure in which the folded portions are stitched up with a tear seam or a structure in which the folded portions are wound by an adhesive tape or the like. At that time, an appropriate structure can be adopted for temporarily holding the loose portions of the webbings 140 in a predetermined folded state (a predetermined folded-back state) or in a predetermined wound state with a webbing holding device.

Figure 7:
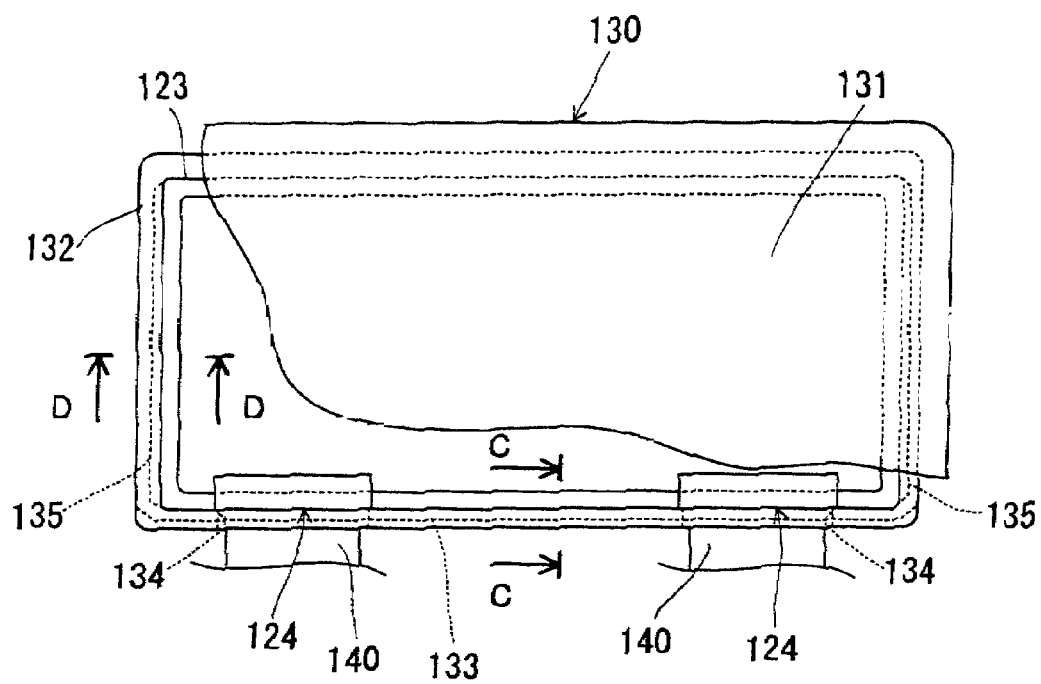
FIG. 7 shows a module cover 130 and a retainer 123 of the embodiment viewed from the top of the vehicle.
Figure 8:
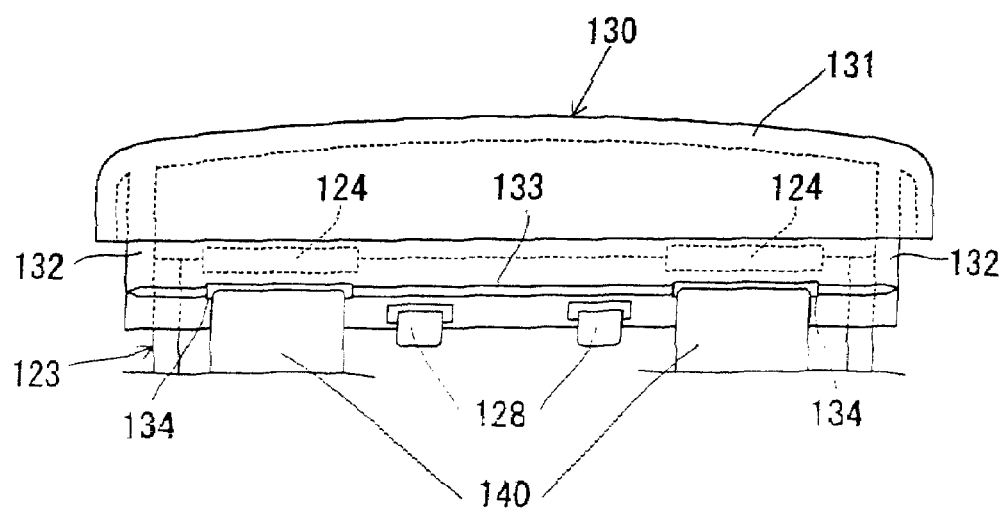
FIG. 8 shows the module cover 130 and the retainer 123 from the rear of the vehicle.
Figure 9:
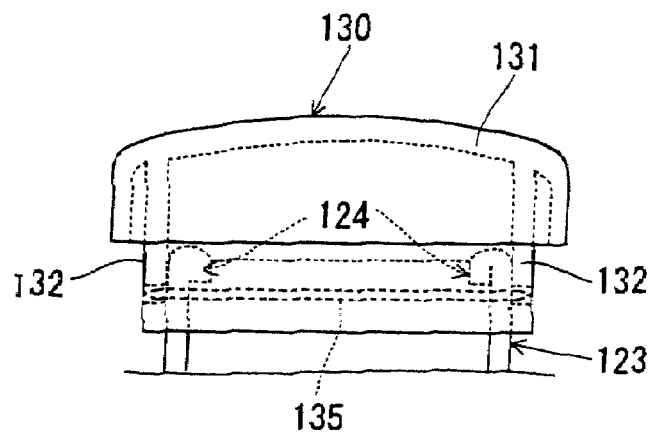
FIG. 9 shows the module cover 130 and the retainer 123 from the side of the vehicle.
Figure 10:
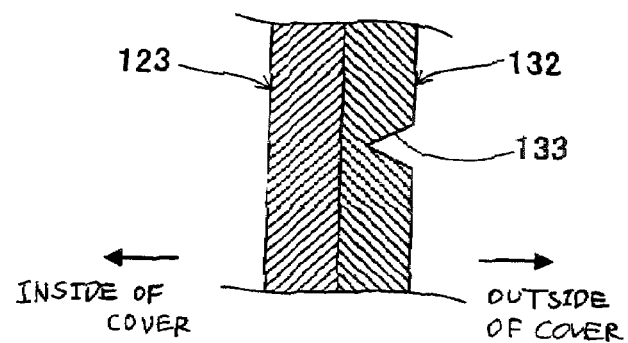
FIG. 10 shows a section taken along line C-C in FIG. 7.
Figure 11:
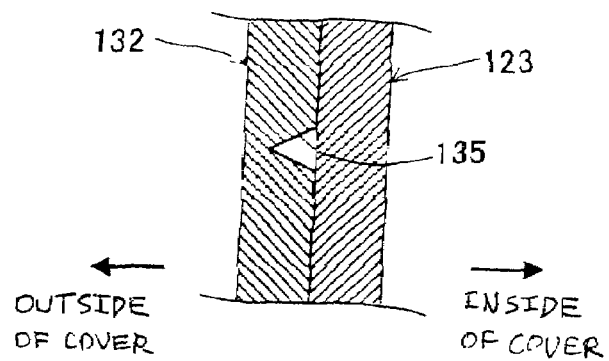
FIG. 11 shows a section taken along line D-D in FIG. 7.

Referring to FIGS. 7 to 11, a more detailed description of the module cover 130 will be given. FIG. 7 shows the module cover 130 and the retainer 123 of the embodiment viewed from the top of the vehicle; FIG. 8 shows them from the rear of the vehicle; FIG. 9 shows them from the side of the vehicle; FIG. 10 shows a section taken along line C-C of FIG. 7; and FIG. 11 shows a section taken along line D-D of FIG. 7.

As shown in FIGS. 7 to 9, the erect portion 132 of the module cover 130 of the embodiment has a tear line 133 along the outer periphery thereof adjacent to the rear of the vehicle (adjacent to the occupant), and two tear lines 135 along the inner periphery on both sides. In this embodiment, the tear lines 133 and 135 are provided not to the top plate 131 but to the erect portion 132. Accordingly, even if a load such as an occupant or a burden is applied from above the module cover 130, the load is not directly applied to the tear lines 133 and 135, thus preventing the module cover 130 from being torn open along the tear lines 133 and 135. The embodiment may have a continuous tear line from the erect portion 132 of the module cover 130 across another portion of the top plate 131.

The disposition of the through holes 134 on the tear line 133 streamlines the structure because the installation locations are shared.

As shown in FIGS. 10 and 11, the tear lines 133 and 135 are formed by providing triangular cutouts in the erect portion 132. Thus three continuous grooves with a predetermined depth, or thin portions of a substantially even thickness within the thickness of the erect portion 132 are formed in the erect portion 132 adjacent to the rear and both sides of the vehicle. Thus the tear lines 133 and 135 are also referred to as "linear grooves," "thin portions," or "fragile portions" having a linear groove of a predetermined depth. Since the thickness at the tear lines 133 and 135 (the thickness of the thin portions) is appropriately set on the basis of the specifications of the airbag 121, such as a deploying force, the module cover 130 can be smoothly torn open along the tear lines 133 and 135 of the erect portion 132 by the deploying force of the airbag 121 in the event of a vehicle accident, so that the portion of the module cover 130 above the tear lines 133 and 135 deploys toward the front of the vehicle with the portion of the erect portion 132 adjacent to the front of the vehicle as the hinge. At that time, the portion of the cover lower than the tear lines 133 and 135 is secured to the retainer 123 when the tear lines 133 and 135 are torn open or the airbag 121 deploys such that fasteners 128 on the retainer 123 are hooked in the through holes of the erect portion 132 or fixed with rivets (refer to FIG. 8). The tear lines may be continuous grooves of a specified depth disposed at regular intervals, continuous perforations, or continuous slits disposed at regular intervals, instead of the continuous groove of a predetermined depth.

The cutoffs of the tear lines 133 and 135 of the embodiment may be formed in dies during the molding of the module cover, or alternatively, may be formed by post machining such as laser beam machining or ultrasonic machining after the molding of the module cover. The sections of the tear lines 133 and 135 may be varied to a triangle, a semicircle, etc. as appropriate. The tear line 133 may be formed along the inner circumference of the erect portion 132 adjacent to the rear of the vehicle (adjacent to the occupant), while the tear lines 135 may be formed along the outer circumference of the both sides of the erect portion 132.

Figure 12:
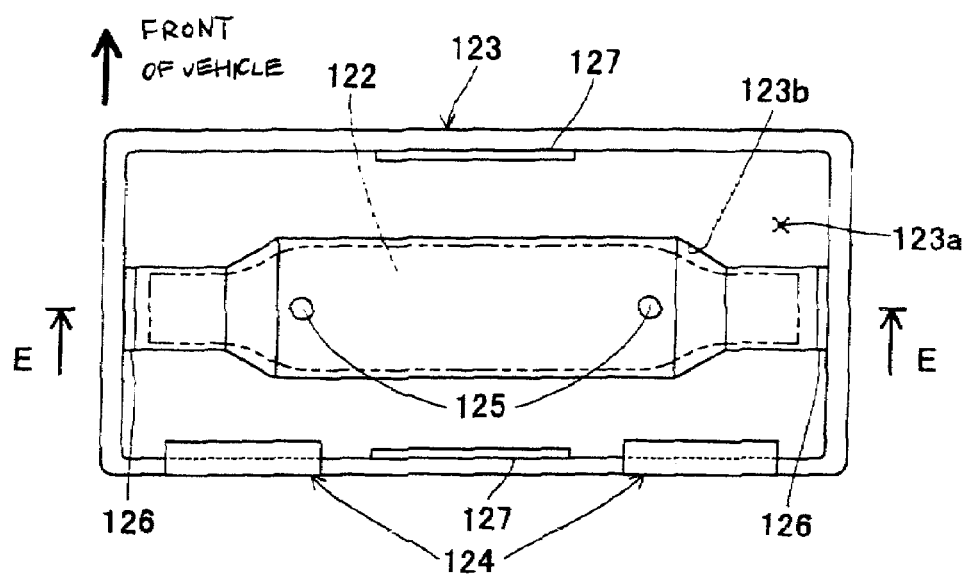
FIG. 12 shows the retainer 123 of the embodiment viewed from the top of the vehicle.
Figure 13:
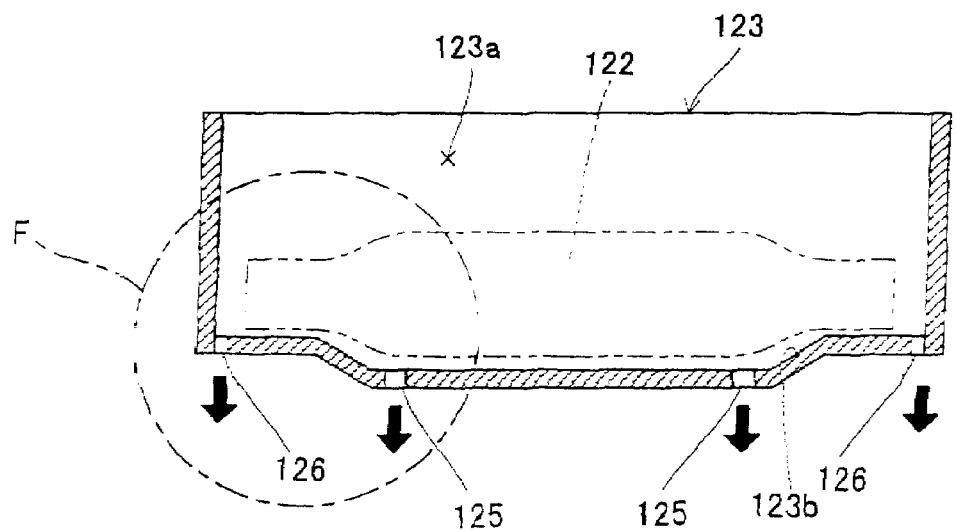
FIG. 13 shows a section taken along line E-E in FIG. 12.
Figure 14:
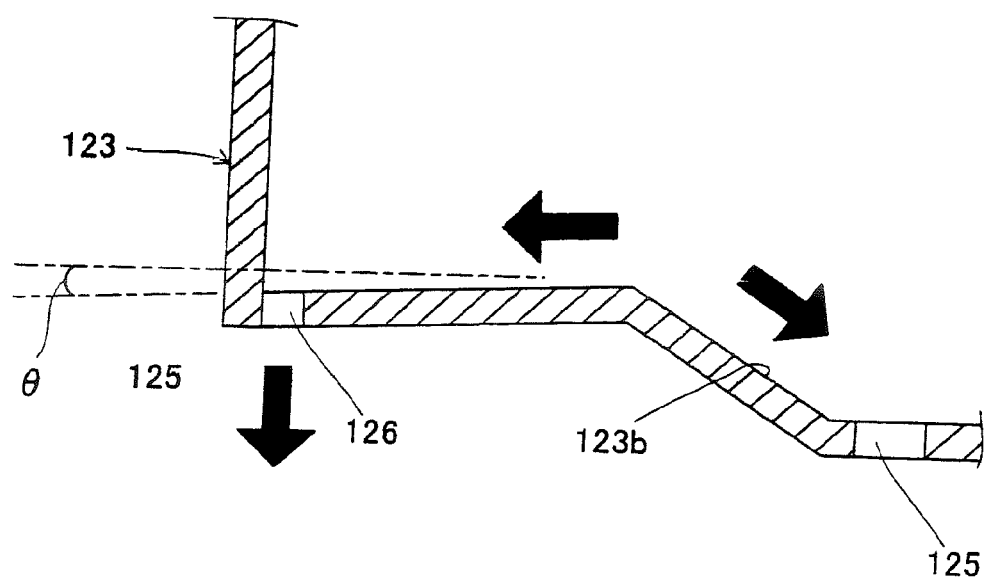
FIG. 14 is an enlarge view of part F in FIG. 13.

Referring then to FIGS. 12 to 14, a more detailed structure of the retainer 123 will be presented. FIG. 12 shows the retainer 123 of the embodiment viewed from the top of the vehicle; FIG. 13 shows a section taken along line E-E of FIG. 12; FIG. 14 shows an enlarged view of part F in FIG. 13.

As shown in FIGS. 12 and 13, the retainer 123 of the embodiment has a pair of hole-like first through portions 125 at an inflator housing 123b at the bottom (corresponding to "the bottom area" of the present invention) of the retainer 123, a pair of slit-like second through portions 126 at the right and left ends, and a pair of slit-like third through portions 127 at the front and rear ends. The first through portions 125, the second through portions 126, and the third through portions 127 extend vertically through the bottom of the retainer 123, and have a function of draining water entering the retainer 123 to the outside of the retainer 123. Thus, the water entering the retainer 123 is continuously or intermittently drained through the first through portions 125, the second through portions 126, and the third through portions 127 to the outside of the retainer 123 by gravitation. The first through portions 125, the second through portions 126, and the third through portions 127 correspond to "openings for draining liquid in the housing to the outside of the housing."

Since the housing like the retainer 123 of the embodiment is a bottomed box having an airbag opening on the top, liquid such as water or oil may be prone to enter or reside in the housing through the periphery of the airbag opening even with high tightness. Particularly, general motorcycles have an airbag apparatus exposed to the outside of the vehicle body in contrast to cars, so that such a problem may be pronounced under the influence of rain, cleaning water, and humidity. Accordingly, the embodiment has the first through portions 125, the second through portions 126, and the third through portions 127 for drainage at the bottom of the retainer 123. Of course, liquids such as oil entering the retainer 123 other than water may be drained from the retainer 123 through the first through portions 125, the second through portions 126, and the third through portions 127. The through portion for drainage may be holes, slits, mesh, a punching plate, or other openings. In this invention, the installation locations and the number of installation locations of the draining through portion may be varied as appropriate.

The first through portions 125 are located at the recessed inflator housing 123b, which is the lowest of the bottom of the retainer 123. More specifically, the bottom of the retainer 123 has a downward slope (curved slope) toward the first through portions 125. Accordingly, the water entering the retainer 123 is collected to the first through portions 125 along the slope of the inflator housing 123b, and is surely drained through the first through portions 125 to the outside of the retainer 123.

On the other hand, the second through portions 126 have the function of draining the water, which enters the retainer 123 and resides at the right and left ends thereof to the outside of the retainer 123 when the motorcycle 100 is parked at an angle using a side stand, or when the vehicle body tilts laterally during driving. Furthermore, as shown in FIG. 14, the bottom of the retainer 123 decreases in height toward the second through portions 126 (at an inclination angle $\theta$). In other words, the bottom of the retainer 123 has a downward slope (linear slope) toward the second through portions 126. Thus, the water entering the retainer 123 is collected to the second through portions 126 along the slope of the bottom of the retainer 123 when the vehicle body tilts and even when the vehicle body is in a horizontal position, and is surely drained through the second through portions 126 to the outside of the retainer 123. Particularly, since the second through portions 126 are disposed at the right and left ends of the retainer 123, the second through portions 126 easily become the lowest of the bottom of the retainer 123 when the motorcycle tilts to the right or left side, thus increasing the draining function. Motorcycles tilt to the right or left when parked at a rightward or leftward inclination, or when tilted to the right or left during driving on a right or left curve. The inclination angle $\theta$ of the bottom of the retainer 123 may be appropriately set according to the specifications of the retainer 123.

Furthermore, the third through portions 127 have the function of draining the water intruding into the retainer 123 and residing at the front and rear end. For example, the motorcycle 100 tilts on an upward slope or downward slope run because the front of the body becomes higher or lower than the rear. In this embodiment, the third through portion 127 on the front or rear side easily becomes the lowest of the bottom of the retainer 123, so that the water in the retainer 123 is surely drained from the retainer 123 through the third through portion 127. Vehicles tilt to the front or rear during running on an uphill or downhill slope or when the retainer 123 itself is combined to the body on a slant.

Preferably, for the draining structure of the embodiment in view of the surface tension of water, the first through portions 125 have a hole diameter of 7 mm or more (38 mm2 or more in section area), and the second through portions 126 and the third through portions 127 have the same section area as that of the first through portions 125 or the same slit width as the hole diameter of the first through portions 125.

Figure 15:
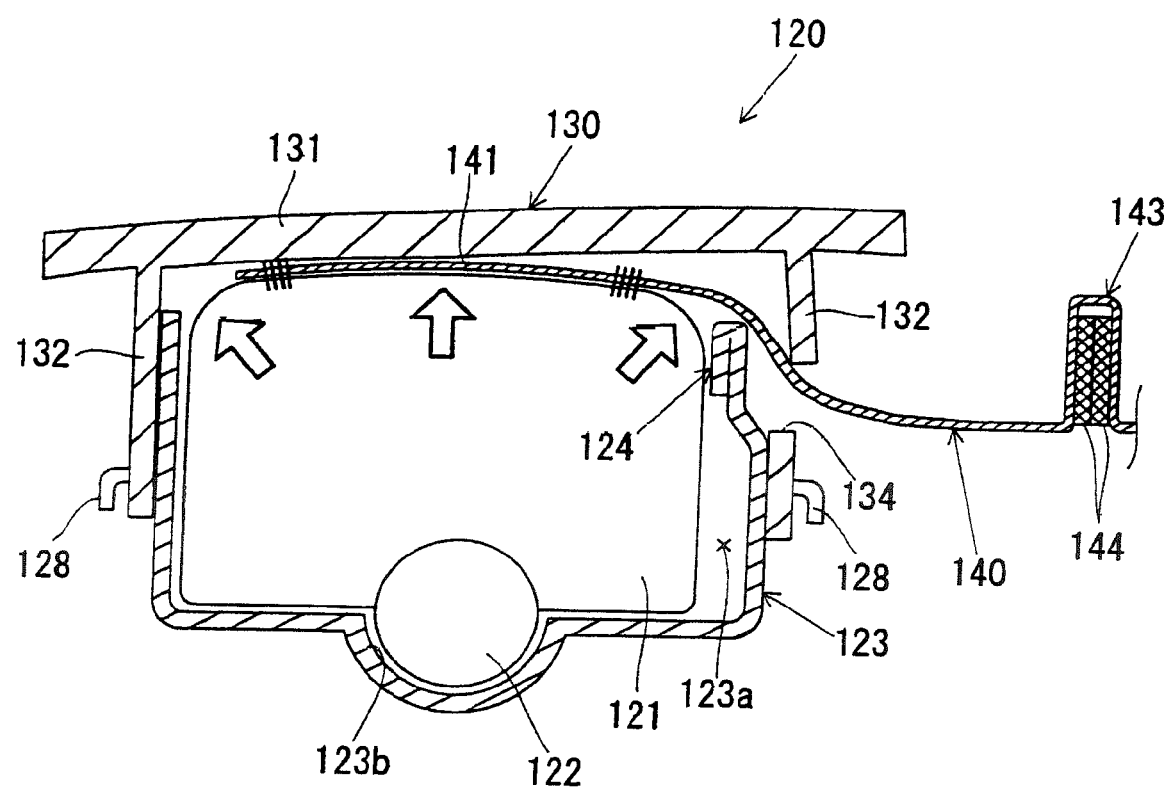
FIG. 15 shows the state of an airbag 121 of the airbag apparatus 120 at the start of inflation.
Figure 16:
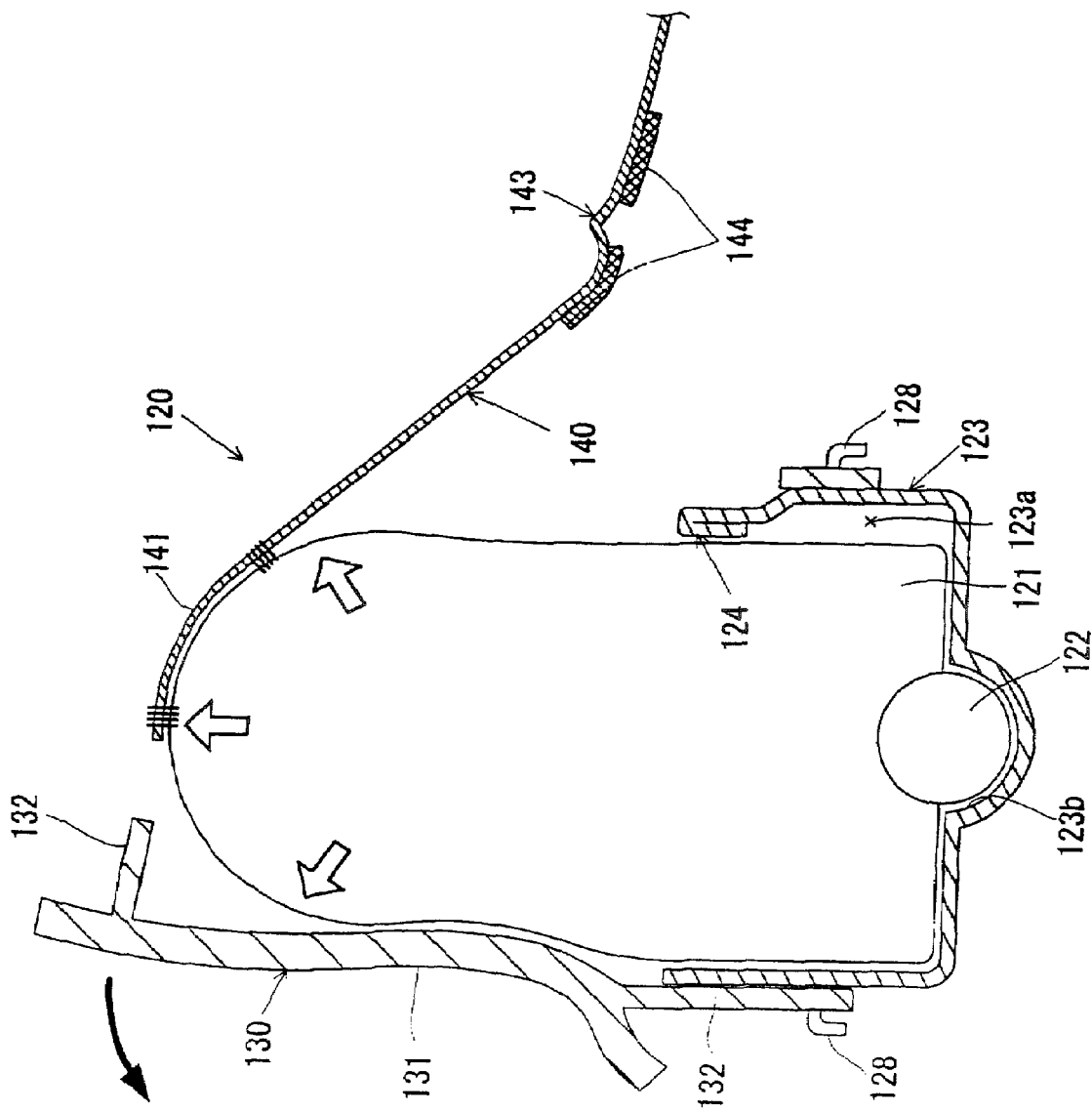
FIG. 16 shows the airbag 121 at the middle of inflation.
Figure 17:
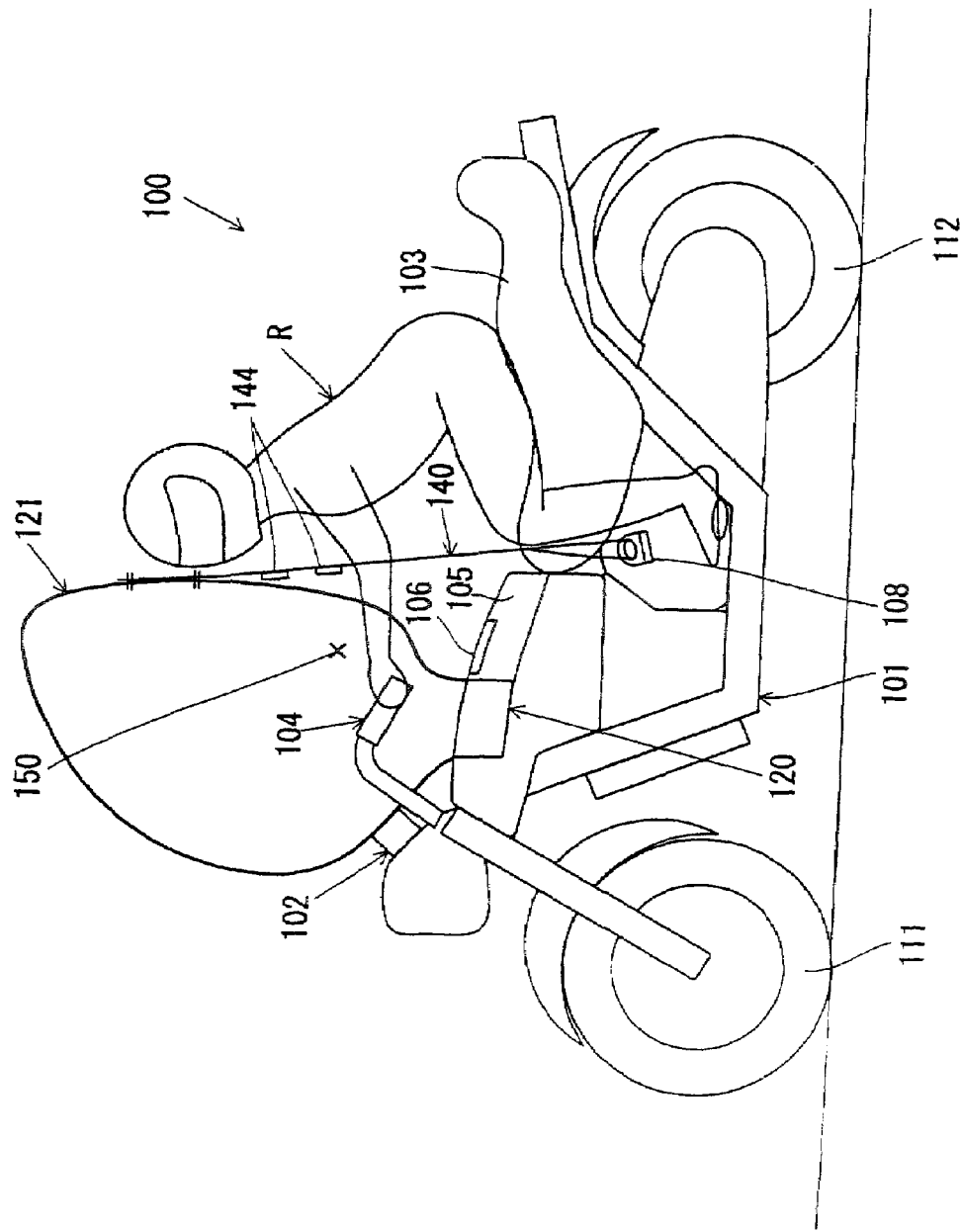
FIG. 17 shows the airbag 121 at the completion of inflation, as viewed from the side of the vehicle.
Figure 18:
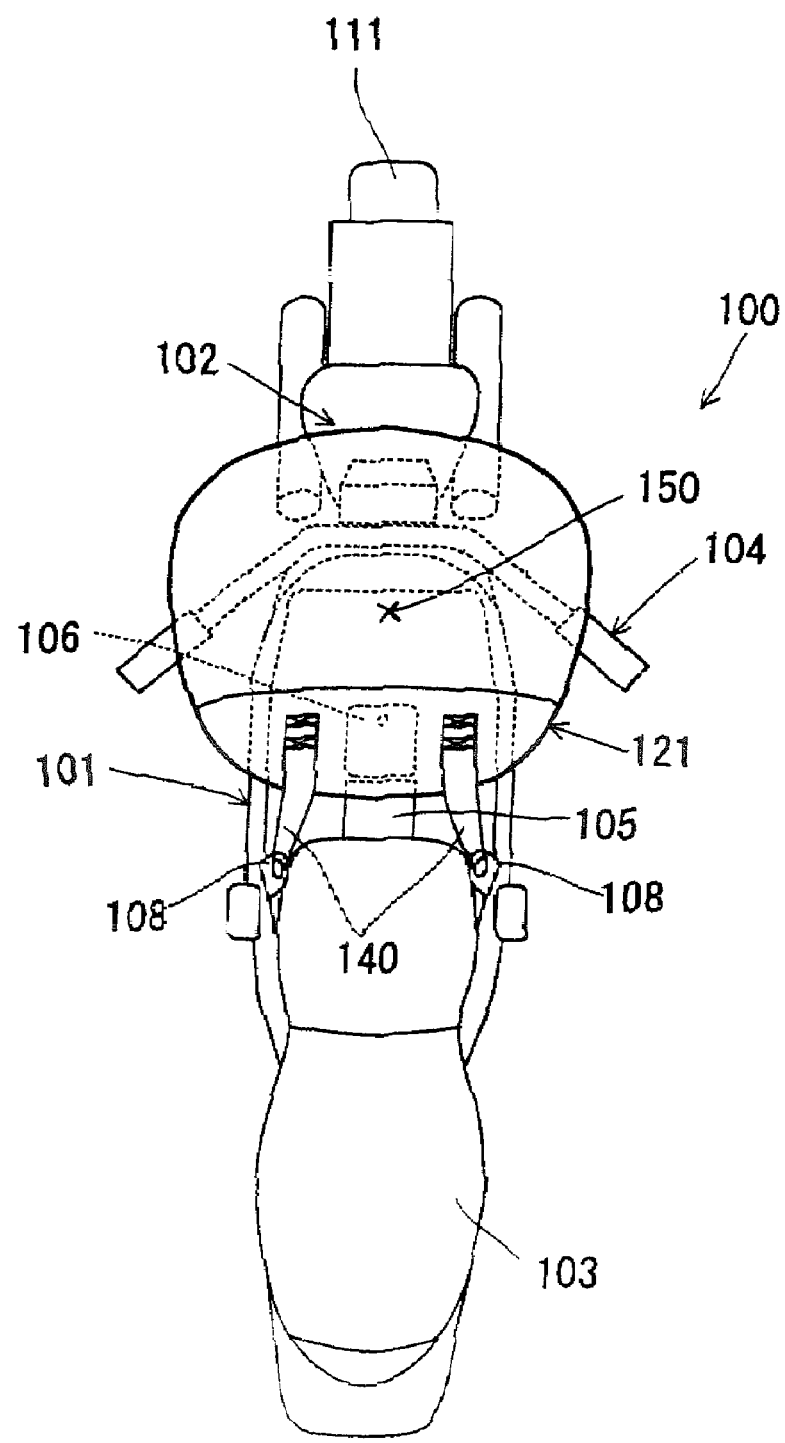
FIG. 18 shows the airbag 121 at the completion of inflation, as viewed from the top of the vehicle.

Referring now to FIGS. 15 to 18, the motion of the airbag apparatus 120 will be described. FIG. 15 shows the state of the airbag 121 of the airbag apparatus 120 at the start of inflation; FIG. 16 shows the airbag 121 at the middle of inflation; and FIGS. 17 and 18 show the airbag 121 at the completion of inflation. Specifically, FIG. 17 shows the airbag 121 at the completion of inflation, viewed from the side of the vehicle; and FIG. 18 shows the airbag 121 at the completion of inflation, viewed from the top of the vehicle.

When the motorcycle 100 comes into a collision in the traveling direction, the occupant is moving (flung) ahead of the motorcycle 100. In the embodiment, upon detection of the frontal collision, the inflator 122 of the airbag apparatus 120 is activated to supply inflation gas generated by the inflator 122 into the airbag 121. This starts the inflation (deployment) of the airbag 121 in the direction of arrow 10 in the airbag apparatus 120 of FIG. 3 in a state before activation. Since inflation gas is continuously fed into the airbag 121, the airbag 121 is expanded in sequence from the retainer 123.

As shown in FIG. 15, with the airbag 121 at the beginning of deployment, the airbag 121 in the process of deployment pushes the top plate 131 of the module cover 130 from below in the retainer 123. Thus the module cover 130 that has received a predetermined deploying force or more from the airbag 121 is torn open along the tear lines (the tear lines 133 and 135) of the erect portion 132. Upon starting the deployment of the airbag 121, the webbings 140 stitched to the airbag 121 is subjected to a tensile load via the first end 141. Thus the webbings 140 pushes open the webbing covers 107 upward to thereby release the covering by the webbing covers 107.

As shown in FIG. 16, with the airbag 121 in the middle of deployment, the module cover 130 torn open along the tear lines further receives the deploying force from the airbag 121 to deploy ahead of the vehicle with the portion of the erect portion 132 adjacent to the front of the vehicle as the hinge. At that time, when a further tensile load is applied to the webbings 140 via the first end 141, the retaining force by the hook-and-loop fastener 144 is canceled, so that the folded state of the folded portions 143 is released. Since the folded portions 143 of the webbings 140 of the embodiment are generally disposed symmetrically, the loads on the airbag 121 by the webbings 140 extending during the deployment of the airbag 121 can be made substantially equal on the right and left, whereby the airbag 121 can deploy bilaterally evenly.

Thus, as shown in FIGS. 17 and 18, the airbag 121 is completely deployed. In this state, the inflated airbag 121 fills the occupant restraining region 150 in front of a rider R in FIG. 17. Thus, the rider R who is moving forward by the kinetic energy of the collision is restrained by the airbag 121 and the impact to the rider R during restraint is reduced.

The webbings 140 fully extend substantially linearly between the airbag 121 and the fastener 108 to restrict the motion of the airbag 121 moving upward and forward of the vehicle by the tension thereof. The fully inflated airbag 121 comes into contact with the front portion 102 at the front of the vehicle, and into contact with the handlebars 104 at both sides. This arrangement stabilizes the restraint of the rider R with the fully inflated airbag 121.

According to the embodiment, the water or oil entering the retainer 123 that houses the airbag 121 can be easily drained to the outside of the retainer 123 through the first through portions 125, the second through portions 126, and the third through portions 127. Particularly, the bottom of the retainer 123 has downward slopes (curved slopes) toward the first through portions 125 and downward slopes (linear slopes) toward the second through portions 126. This arrangement promotes guiding of the liquid such as water in the retainer 123 toward the first through portions 125 and the second through portions 126, improving draining function.

According to the embodiment, the second through portions 126 are disposed on the right and left ends of the retainer 123, or the third through portions 127 are disposed on the front and rear of the retainer 123. Thus the liquid such as water in the retainer 123 can be drained to the outside of the retainer 123 through the second through portions 126 or the third through portions 127 using the tilt of the motorcycle. This arrangement is therefore rational.

It is to be understood that the invention is not limited to the above-described embodiment, but various applications and modifications can be made. For example, the following applications are possible.

While the embodiment has been described with reference to the motorcycle 100 of what is called a touring type, the invention may be applied to other types of motorcycle such as motor scooters having a space that enables lateral movement of the rider's legs between the handlebars and the seat and to motorcycle vehicles other than the motorcycle 1 00.

While the embodiment has been described about the case in which the airbag apparatus 120 is disposed in front of the fuel tank 106, the position of the airbag apparatus 120 may be varied as appropriate, provided that the airbag 121 can deploy into a desired region in a vehicle collision. For example, the airbag apparatus 120 may be disposed behind or lower than that shown in FIG. 1.

What is claimed is:

1. An airbag apparatus to be mounted to a motorcycle, the airbag apparatus comprising:
   an airbag to be deployed and inflated upon detection of a front collision of the motorcycle;
   a retainer for housing the airbag in a folded state and having a bottom wall and at least one upstanding side wall extending upwardly from the bottom wall;
   an inflator in the retainer for supplying inflation gas to the airbag; and
   a through opening in the retainer at a juncture between the retainer bottom wall and the upstanding side wall for draining liquid from the retainer.

2. The airbag apparatus of claim 1 wherein the through opening includes a pair of through openings each having a diameter of at least 7 mm.

3. The airbag apparatus of claim 1 wherein the through opening includes at least one pair of through openings symmetrically positioned in the retainer bottom wall.

4. The airbag apparatus of claim 1 wherein the trough opening comprises a plurality of through openings, the bottom wall includes four sides and the at least one side wall includes four side walls upstanding from the four sides of the bottom wall with the plurality of-through openings located at junctures between the bottom wall and upstanding side walls.

5. The airbag apparatus of claim 1 wherein the through opening comprises a pair of through openings located at opposing sides of the bottom wall of the retainer.

6. An airbag apparatus to be mounted to a motorcycle, the airbag apparatus comprising:
- an airbag to be deployed and inflated upon detection of a front collision of the motorcycle;
- a retainer for housing the airbag in a folded state;
- an inflator in the retainer for supplying inflation gas to the airbag; and
- a through opening in the retainer for draining liquid from the retainer,
- wherein the retainer includes a base portion having a section that is recessed from the remainder of the base portion and on which the through opening is formed, and the base portion of the retainer includes opposite inclined portions that slope downward toward opposing edges of the recessed section of the base portion of the retainer.

7. An airbag apparatus to be mounted to a motorcycle, the airbag apparatus comprising:
- an airbag to be deployed and inflated upon detection of a front collision of the motorcycle;
- a retainer for housing the airbag in a folded state;
- an inflator in the retainer for supplying inflation gas to the airbag;
- a through opening in the retainer for draining liquid from the retainer, and
- a cover portion for covering the retainer having peripheral side wall portions depending therefrom, with at least one of the peripheral side wall portions secured to the retainer and an enlarged through hole on one of the peripheral side wall portions for a tether to extend therethrough.

8. A motorcycle comprising:
- a body;
- a seat of the body for supporting a rider seated thereon;
- an airbag module mounted forwardly of the seat;
- a retainer of the airbag module having open-top, box-configuration with a bottom wall and upstanding side walls extending upwardly therefrom to an upper opening of the retainer;
- a cover of the airbag module that extends over the retainer upper opening;
- an airbag housed in the retainer in a folded state for being deployed and inflated out therefrom through the upper opening thereof to open the cover upon detection of a front collision of the motorcycle;
- an inflator in the retainer for supplying inflation gas to the airbag and not into the retainer outside the airbag so that the retainer upstanding walls do not have vent openings for inflation gas;
- a plurality of through openings in the retainer for draining liquid out therefrom and being disposed at junctures between the retainer bottom wall and upstanding side walls so that the inflator is not in overlying relation to the through openings.

9. The motorcycle of claim 8 wherein the plurality of through openings include symmetrically opposed through openings.

* * * * *

UNITED STATES PATENT AND TRADEMARK OFFICE
CERTIFICATE OF CORRECTION

PATENT NO. : 7,665,757 B2  Page 1 of 1
APPLICATION NO. : 11/470758
DATED : February 23, 2010
INVENTOR(S) : Yasuhito Miyata It is certified that error appears in the above-identified patent and that said Letters Patent is hereby corrected as shown below:

Title Page, Item [57], In the Abstract
Column 2, line 2, in the Abstract, delete "of" and insert -- of a --.

In the Claims
Claim 4, Column 10, Line 62, delete "trough" and insert -- through --.

Claim 6, Column 11, Line 7, delete "motorcycyle:" and insert -- motorcycle; --.

Claim 6, Column 11, Line 13, delete "haying" and insert -- having --.

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO.         : 7,665,757 B2                                        Page 1 of 1
APPLICATION NO. : 11/470758
DATED              : February 23, 2010
INVENTOR(S)        : Yasuhito Miyata It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 598 days.

Signed and Sealed this

Seventh Day of December, 2010

David J. Kappos
*Director of the United States Patent and Trademark Office*